United States Patent
Mackel et al.

(10) Patent No.: US 7,090,634 B2
(45) Date of Patent: Aug. 15, 2006

(54) DRIVING SYSTEM FOR A SEPARATOR HAVING A CENTRIFUGAL DRUM AND A NECK BEARING

(75) Inventors: Wilfried Mackel, Oelde (DE); Helga Tietz, Oelde (DE)

(73) Assignee: Westfalia Separator AG, Oelde (DE)

( * ) Notice: Subject to any disclaimer, the term of this patent is extended or adjusted under 35 U.S.C. 154(b) by 67 days.

(21) Appl. No.: 10/809,858

(22) Filed: Mar. 26, 2004

(65) Prior Publication Data

US 2004/0192532 A1    Sep. 30, 2004

(30) Foreign Application Priority Data

Mar. 28, 2003    (DE)    ................. 103 14 118

(51) Int. Cl.
*B04B 9/00*    (2006.01)
(52) U.S. Cl. .......................... 494/15; 494/83; 384/438
(58) Field of Classification Search ............ 494/82–84, 494/15, 46; 464/179–180; 384/108, 498, 384/438, 440
See application file for complete search history.

(56) References Cited

U.S. PATENT DOCUMENTS

| | | | | |
|---|---|---|---|---|
| 1,362,619 A * | 12/1920 | Hall | ............................ | 384/193 |
| 1,415,881 A * | 5/1922 | Leitch | .......................... | 494/29 |
| 1,876,656 A * | 9/1932 | Forsberg | ..................... | 384/627 |
| 1,888,475 A * | 11/1932 | Schmitz | ....................... | 384/480 |
| 2,040,351 A * | 5/1936 | Williams | ..................... | 384/196 |
| 2,094,058 A * | 9/1937 | Bryson | ........................ | 384/196 |
| 2,129,992 A * | 9/1938 | De Mattia | .................... | 494/53 |
| 2,281,797 A * | 5/1942 | Potter | ............................ | 494/60 |
| 2,487,343 A * | 11/1949 | Kopf | ............................ | 384/535 |
| 2,534,738 A * | 12/1950 | Scott | ............................ | 384/196 |
| 2,556,317 A * | 6/1951 | Cook | ............................ | 384/535 |
| 2,698,131 A * | 12/1954 | Cook | ............................ | 494/46 |
| 2,913,169 A * | 11/1959 | Wilsmann | ..................... | 494/15 |
| 2,916,201 A * | 12/1959 | Hemfort et al. | .............. | 494/83 |
| 2,919,960 A * | 1/1960 | Whitney | ..................... | 384/108 |
| 3,306,681 A * | 2/1967 | Barringer | ..................... | 384/193 |
| 3,814,306 A * | 6/1974 | Wutz et al. | ..................... | 494/1 |
| 4,202,488 A * | 5/1980 | Jackson et al. | ............... | 494/15 |
| 4,412,707 A * | 11/1983 | Buffet | ......................... | 384/606 |
| 4,457,745 A * | 7/1984 | Broker et al. | ................. | 494/15 |
| 4,654,023 A * | 3/1987 | Foldhazy | ..................... | 494/41 |
| 4,687,463 A * | 8/1987 | Simonnet | ..................... | 494/83 |
| 5,328,441 A * | 7/1994 | Carr | ............................ | 494/58 |
| 5,342,282 A * | 8/1994 | Letourneur | ................. | 494/82 |
| 5,356,367 A * | 10/1994 | Carr | ............................ | 494/58 |
| 5,364,335 A * | 11/1994 | Franzen et al. | ............... | 494/15 |
| 5,425,698 A * | 6/1995 | Carr | ............................ | 494/46 |
| 5,800,070 A * | 9/1998 | Nilsson et al. | .............. | 384/535 |

(Continued)

FOREIGN PATENT DOCUMENTS

AU    62687    6/1892

(Continued)

*Primary Examiner*—Charles E. Cooley
(74) *Attorney, Agent, or Firm*—Barnes & Thornburg LLP

(57) ABSTRACT

A driving system for a separator having a centrifugal drum with a vertical axis of rotation. The driving system includes a vertically aligned driving spindle configured to accommodate a centrifugal drum. The driving spindle is arranged by a neck bearing and a footstep bearing in an opening of a drive housing. The neck bearing is supported in an axially rigid and radially resilient manner on the machine housing. The neck bearing is constructed as an angular ball bearing and supports the centrifugal drum on a spherical-shaped supporting surface of the machine housing.

20 Claims, 2 Drawing Sheets

U.S. PATENT DOCUMENTS

| | | | |
|---|---|---|---|
| 5,848,959 A * | 12/1998 | Droste et al. | 494/15 |
| 6,117,063 A * | 9/2000 | Szepessy et al. | 494/14 |
| 6,224,533 B1 * | 5/2001 | Bengtsson et al. | 494/82 |
| 6,228,016 B1 * | 5/2001 | Kristensen et al. | 494/14 |
| 6,428,460 B1 * | 8/2002 | Appelquist et al. | 494/82 |
| 6,626,814 B1 * | 9/2003 | Setterberg | 494/15 |
| 6,776,752 B1 * | 8/2004 | Carr | 494/38 |
| 6,960,158 B1 * | 11/2005 | Mackel | 494/82 |
| 2004/0142808 A1 * | 7/2004 | Mackel | 494/82 |
| 2004/0192532 A1 * | 9/2004 | Mackel et al. | 494/15 |
| 2005/0065010 A1 * | 3/2005 | Moss | 494/15 |

FOREIGN PATENT DOCUMENTS

| | | |
|---|---|---|
| AU | 175341 | 11/1904 |
| AU | 110574 | 4/1928 |
| AU | 844233 | 7/1952 |
| DE | 1 031 222 | 2/1955 |
| DE | 31 25 832 | 1/1983 |
| DE | 34 32 833 | 4/1985 |
| DE | 37 14 627 | 11/1987 |
| EP | 0054502 A1 * | 6/1982 |
| EP | 0 131 494 | 1/1985 |
| EP | 0215585 A1 * | 3/1987 |
| GB | 255437 | 7/1928 |
| GB | 2277700 A * | 11/1994 |
| IT | 484 873 | 1/1970 |
| WO | 98/57752 | 12/1998 |

* cited by examiner

DRIVING SYSTEM FOR A SEPARATOR HAVING A CENTRIFUGAL DRUM AND A NECK BEARING

This non-provisional application claims benefit of and priority to German Application No. 103 14 118.9-23 filed Mar. 28, 2003, the disclosure of which is hereby incorporated by reference herein.

BACKGROUND

The invention relates to a driving system for a separator having a centrifugal drum with a vertical axis of rotation.

Driving systems of this type are known in many different arrangements, for example, from German Patent Document DE 37 14 627, which shows an arrangement in which a centrifugal drum is placed on the upper free end of a driving spindle which is rotatably disposed below the centrifugal drum by an upper neck bearing and a lower footstep bearing on a drive housing or its supporting elements.

With respect to the state of the art, see also International Patent Document WO 98/5 77 52 A1 and German Patent Document DE 34 32 833 A1. British Patent Document GB 255,437, which is more removed with respect to its type and discloses bearing supports on spherically shaped surfaces, as well as German Patent Document DE 175341 C and Austrian Patent Document AT 110574 are also known.

The driving motor may be arranged below the actual driving spindle or by a belt drive laterally offset thereto. In this arrangement, the upper neck bearing is resiliently supported on the drive housing. During precession movements or the like of the driving spindle, it can therefore carry out its radial movement together with it.

In the axial direction, the weight of the centrifugal drum is supported by the footstep bearing on the drive housing. In the radial direction, the footstep bearing is fixed on the drive housing.

A comparable arrangement is known from German Patent Document DE 844 233, in which, for ensuring the radial mobility, one of the bearings is supported in the upward direction in a type of ball bearing surface.

It is also known from German Patent Document DE 62 687 to support the drum weight below the neck bearing.

The use of angular ball bearings for the bearing of driving spindles is known, for example, from Swiss Patent Document CH 484 873. From this document, it is also known to implement the supporting of the bearing in the radial direction relative to the drive housing by rubber elements.

From German Patent Document DE 1 031 222, it is also known to support the drum weight below the footstep bearing axially in a type of universal ball joint.

With respect to the state of the art, German Patent Document DE 31 25 832 as well as European Patent Document EP 0 131 494 and German Patent Document DE 34 32 833 A1 are also known. The latter document again shows the use of angular ball bearings as well as the arrangement of universal ball joints for supporting the driving spindle above the footstep bearing.

SUMMARY

The present disclosure relates to a driving system for separators having a centrifugal drum with a vertical axis of rotation, which can be produced in a cost-effective manner and have a good machine-dynamic behavior.

The driving systems includes a vertically aligned driving spindle configured to accommodate a centrifugal drum. The driving spindle is arranged by a neck bearing and a footstep bearing in an opening of a drive housing. The neck bearing is supported in an axially rigid and radially resilient manner on the machine housing. The neck bearing is constructed as an angular ball bearing and supports the centrifugal drum on a spherical shaped supporting surface of the machine housing.

As a result of the above construction, it is possible to uncouple the motor from the bearing system of the driving spindle or the centrifugal drum. In this manner, for example, a direct drive, a drive via a transmission or via a pulley are conceivable.

A center point of the spherical-shaped supporting surface is preferably situated in the area of the footstep bearing, particularly in its center. The rotating point of the precession movement is therefore placed on an axial position of the driving spindle, in which the latter is supported by the footstep bearing.

On the inside and upwards, the neck bearing is supported on the driving spindle, and, downward toward the outside, it is supported on an outer neck bearing ring.

The neck bearing ring can, in turn, have a spherical construction on its underside and can rest on a complementarily spherical-section-type-shaped bearing collar of the drive housing. In this manner, by using few components, the spherical-surface-shaped support of the centrifugal drum may be cost-effectively implemented by the neck bearing on the machine housing.

A gap is provided between the outer circumference of the neck bearing ring and the inner circumference of the drive housing. In this gap, the arrangement of a spring for the radially resilient supporting of the neck bearing on the machine housing can be implemented.

A sealing and spring ring may be provided to bridge the gap. The sealing and spring element or ring may include an O-ring which is arranged in a groove on the outer circumference of the neck bearing ring, from which it projects radially to the outside. A support may also be implemented in a radial direction by the O-ring. The O-ring may be made of rubber material which may assist frictional damping on the spherical surface by characteristics inherent to it.

The above-mentioned arrangements or embodiments represent a simple construction of the driving system with a minimal number of parts and an axial drum seat accommodation in the upper bearing. An automatic frictional damping takes place by the centrifugal drum weight by a force caused by the drum weight and/or the neck bearing ring rubbing axially on the machine housing or machine frame. Thus, the drive is designed such that, in the case of heavy centrifuges, more damping is generated than in the case of lighter centrifuges.

The above-mentioned arrangements can be supplemented by the supporting surface of the neck bearing ring on the drive housing being in an operative connection with a lubricating system for lubricating the neck bearing. That is so that the lubricating system for lubricating the neck bearing can be utilized for the lubrication of the supporting surface of the drive housing.

Other aspects of the present disclosure will become apparent from the following descriptions when considered in conjunction with the accompanying drawings.

DETAILED DESCRIPTION OF THE DRAWINGS

Figure 1:
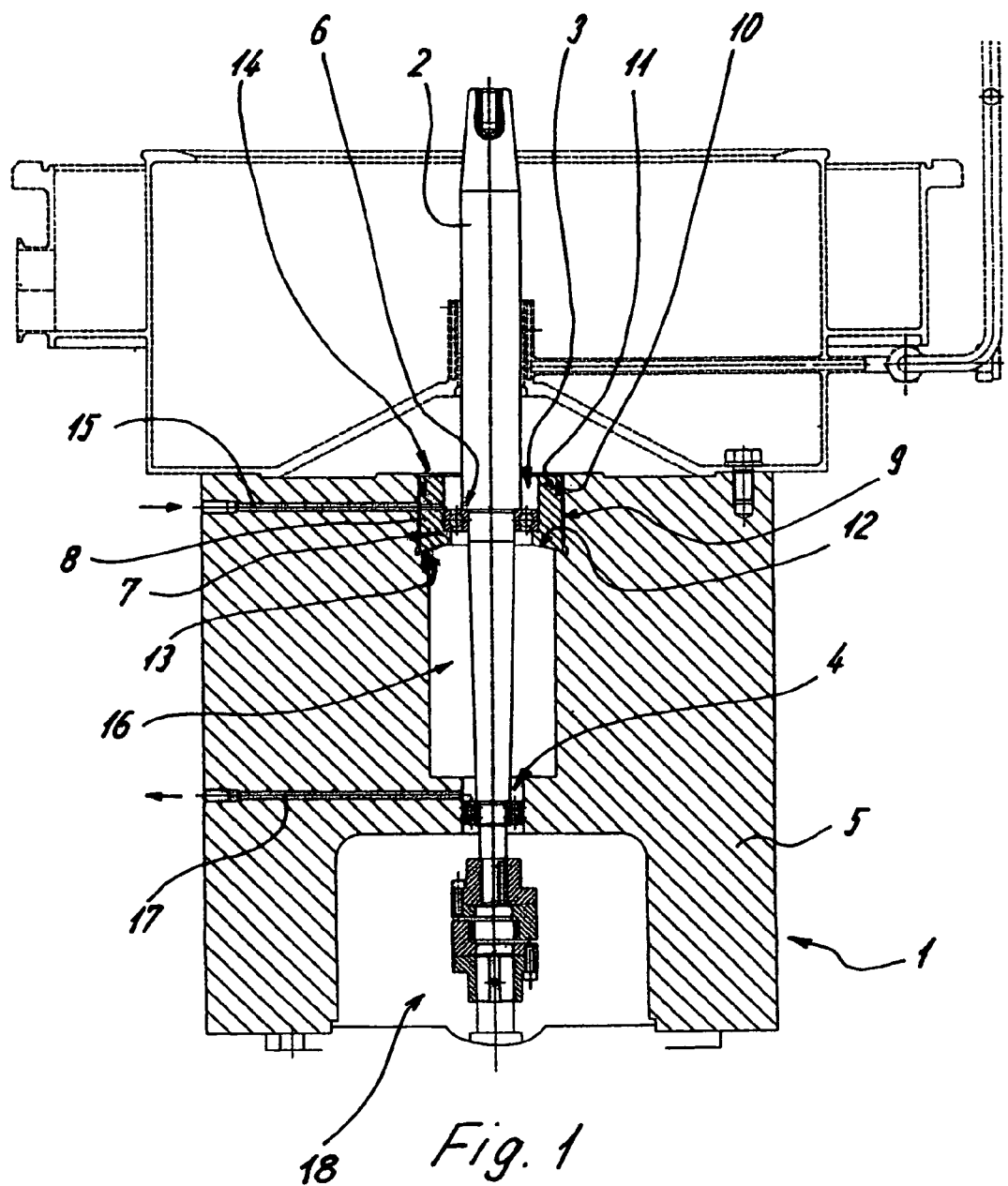
FIG. 1 is a sectional view of a driving system, according to the principles of the present disclosure.

FIG. 1 illustrates a driving system 1 for a separator with a vertical axis of rotation. The separator has a vertically aligned driving spindle 2 for a centrifugal drum, which is not shown. If shown in FIG. 1, the drum would be placed on an upper conical end of the driving spindle 2.

For driving the driving spindle 2, the driving system 1 includes a motor, which is not shown. The motor, as an example, can be connected directly by a coupling 18 arranged below a point of rotation M of a precession movement. The coupling 18 may adjoin a lower end of the driving spindle 2, or may adjoin whatever drives the driving spindle 2 indirectly, for example, a belt drive (not shown) and/or by a transmission (not shown).

The driving spindle 2 is disposed by a neck bearing 3 and a footstep bearing 4 in a bore-type opening 14 of a one-piece or multi-piece drive housing 5.

The neck bearing 3 is arranged to be axially rigidly or stationarily fixed and radially movable. In contrast, the footstep bearing 4 is arranged in a fixed manner in the drive housing 5 and is axially movably constructed as a movable bearing, or as a self-aligning ball bearing.

Figure 2:
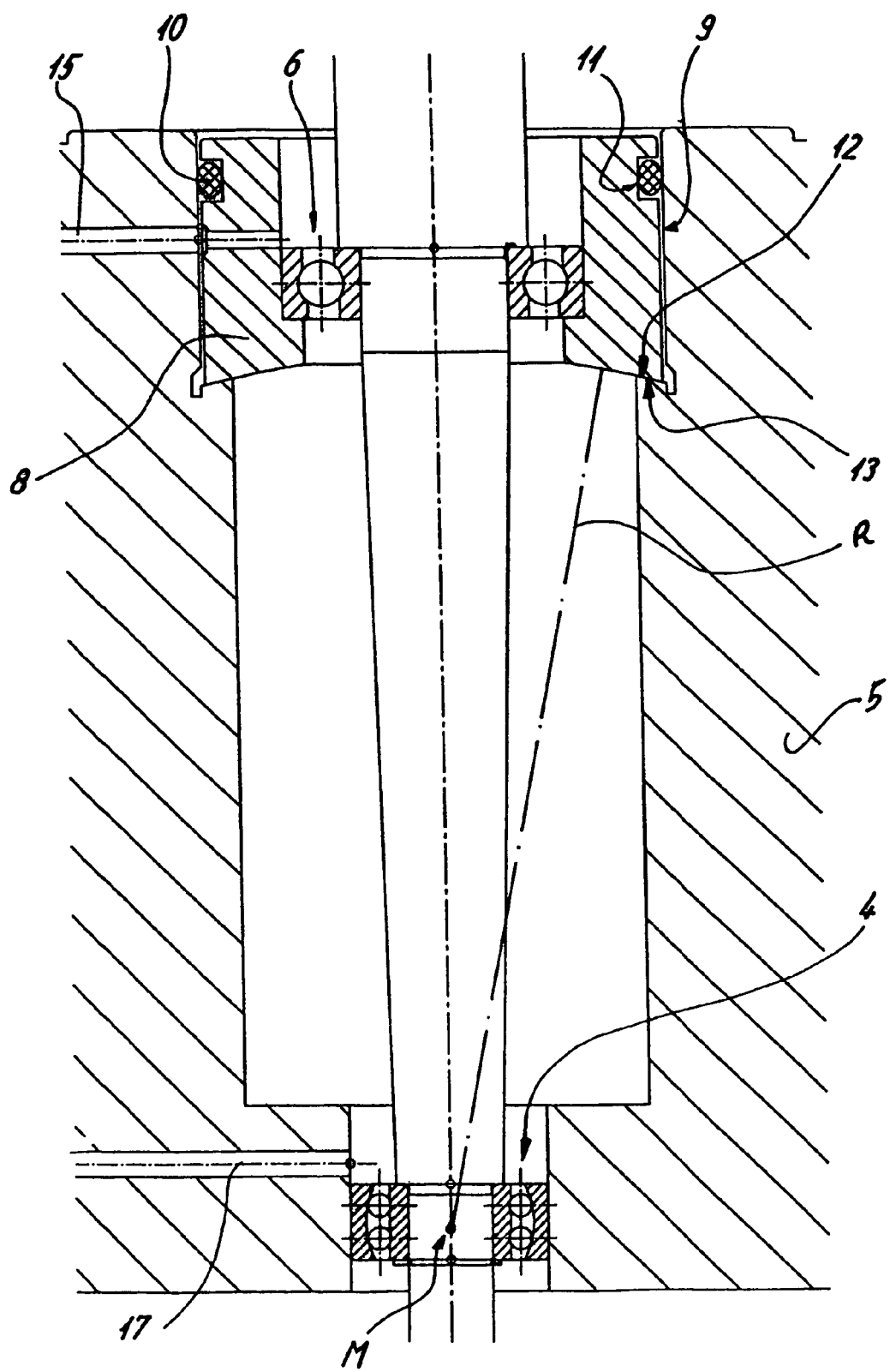
FIG. 2 is an enlarged cutout of a portion of FIG. 1.

According to FIGS. 1 and 2, the neck bearing 3 is constructed as an angular ball bearing. In an area of an upper inner circumference of the drive housing 5 the angular ball bearing is supported on an upper stepping or a step 6 of the driving spindle 2. It is also supported, in a diametrically opposite area, on a lower stepping or a step 7 of a neck bearing ring 8 surrounding the angular ball bearing on its outer circumference.

Between the outer circumference of the neck bearing ring 8 and the inner circumference of the drive housing 5, a gap 9 is constructed, so that the spindle 2 can radially move with a slight play. The gap 9 is resiliently bridged by a sealing and spring ring 10, shown, for instance on FIGS. 1 and 2 as an O-ring which is arranged in a groove 11 on the outer circumference of the neck bearing ring 8 and from which groove 11 the ring 10 projects to the outside of neck bearing ring 8. In a very simple fashion, the O-ring 10 implements a radial supporting of a weight of the centrifugal drum. In addition, the driving spindle 2 centers in the O-ring 10, so that the O-ring 10 permits radial movements of the driving spindle 2 and of the neck bearing 3. Additional and/or alternative spring arrangements are conceivable.

On its underside 12, the neck bearing ring 8 has a ball and socket type construction and rests on a bearing collar 13 of the drive housing 5 formed in a complementarily spherical-section-type manner, for instance, like a surface section of a ball with a radius R with a center point M in an area of the footstep bearing 4 and neck bearing 3. Thus, the neck bearing ring 8, because of the gap 9 around its circumference, can be displaced with a corresponding play on the ball and socket type bearing collar 13. In this manner, an axial absorption of the centrifugal drum weight takes place by a few constructive devices in the neck bearing 3. As a result, and as mentioned above, the center point M of the precession movement is also situated in the area of the footstep bearing 4, and particularly may be at a center of the footstep bearing 4.

For implementing a lubrication system, a first bore 15, for instance, a lubrication bore for a lubricant, such as oil or grease, leads into an area around the driving spindle 2 above the neck bearing 3. The neck bearing 3 and the footstep bearing 4 are connected by a duct 16, shown as a ring duct, which represents a portion of the bore 14. As a result, when oil is used as the lubricant, the two bearings 3, 4 can be lubricated jointly. A removal of the oil can take place in a downward direction (not shown).

By the lubricating system for lubricating the neck bearing 3, a lubrication of a supporting surface of a driving surface on the spherical-section-type bearing surface 13 of the driving housing 5 also takes place directly below the neck bearing 3. In a supplementary manner, a second lubricating bore 17 for the footstep bearing 4 can guide grease directly to the footstep bearing 4.

Although the present disclosure has been described and illustrated in detail, it is to be clearly understood that this is done by way of illustration and example only and is not to be taken by way of limitation. The scope of the present disclosure is to be limited only by the terms of the appended claims.

We claim:

1. A driving system for a separator having a centrifugal drum with a vertical axis of rotation, comprising:
   a vertically aligned driving spindle configured to accommodate a centrifugal drum;
   the driving spindle being arranged by a neck bearing and a footstep bearing in an opening of a drive housing;
   the neck bearing being supported in an axially rigid and radially resilient manner on the machine housing;
   the neck bearing being constructed as an angular ball bearing and supporting the centrifugal drum on a spherical-shaped supporting surface of the machine housing; and
   wherein a center point of the spherical-shaped supporting surface is situated in an area of the footstep bearing.

2. The driving system according to claim 1, wherein the neck bearing is supported on an inside in an upward direction on the driving spindle and in a downward direction toward an outside on an outer neck bearing ring.

3. The driving system according to claim 1, wherein the neck bearing includes a neck bearing ring having a ball and socket-type construction on its underside resting on the complementarily spherical-shaped supporting surface.

4. The driving system according to claim 3, wherein the spherical-shaped supporting surface is utilized for a weight-dependent frictional damping of the driving system.

5. The driving system according to claim 1, wherein the spherical-shaped supporting surface is utilized for a weight-dependent frictional damping of the driving system.

6. The driving system according to claim 1, wherein the footstep bearing is radially fixed in the drive housing and is axially disposed as a movable bearing.

7. The driving system according to claim 1, wherein a supporting surface of a neck bearing ring on the drive housing is connected with a lubricating system for lubricating the neck bearing and the footstep bearing.

8. The driving system according to claim 1, wherein the neck bearing and the footstep bearing are connected by a duct around the driving spindle, so that the two bearings can be jointly lubricated.

9. The driving system according to claim 1, wherein a first lubricating bore for a lubricant leads into an area around the driving spindle above the neck bearing.

10. The driving system according to claim 9, wherein a second lubricating bore is provided for guiding lubricant to the footstep bearing.

11. The driving system of claim 9, wherein the lubricant is one of oil and grease.

12. The driving system of claim 1, wherein the center point is situated in a center of the footstep bearing.

13. A driving system for a separator having a centrifugal drum with a vertical axis of rotation, comprising:

a vertically aligned driving spindle configured to accommodate a centrifugal drum;

the driving spindle being arranged by a neck bearing and a footstep bearing in an opening of a drive housing;

the neck bearing being supported in an axially rigid and radially resilient manner on the machine housing;

the neck bearing being constructed as an angular ball bearing and supporting the centrifugal drum on a spherical-shaped supporting surface of the machine housing;

wherein a gap is disposed between an outer circumference of a neck bearing ring and an inner circumference of the drive housing;

wherein a sealing and spring ring bridges the gap; and wherein the sealing and spring ring includes an O-ring which is arranged in a groove on an outer circumference of the neck bearing ring, from which it projects radially to an outside of the neck bearing ring.

14. The driving system of claim 13, wherein the neck bearing is supported on an inside in an upward direction on the driving spindle and in a downward direction toward an outside on an outer neck bearing ring.

15. The driving system of claim 13, wherein the neck bearing includes a neck bearing ring having a ball and socket-type construction on its underside resting on the complementarily spherical-shaped supporting surface.

16. The driving system of claim 13, wherein the spherical-shaped supporting surface is utilized for a weight-dependent frictional damping of the driving system.

17. The driving system of claim 13, wherein the footstep bearing is radially fixed in the drive housing and is axially disposed as a movable bearing.

18. The driving system of claim 13, wherein a supporting surface of the neck bearing ring on the drive housing is connected with a lubricating system for lubricating the neck bearing and the footstep bearing.

19. The driving system of claim 13, wherein the neck bearing and the footstep bearing are connected by a duct around the driving spindle, so that the two bearings can be jointly lubricated.

20. The driving system of claim 13, wherein a first lubricating bore for a lubricant leads into an area around the driving spindle above the neck bearing, and a second lubricating bore is provided for guiding lubricant to the footstep bearing.

* * * * *